United States Patent [19]

Mahajan

[11] 4,403,706
[45] Sep. 13, 1983

[54] PLASTIC CONTAINER WITH HOLLOW INTERNAL RIB REINFORCED BOTTOM AND METHOD OF FORMING THE SAME

[75] Inventor: Gautam K. Mahajan, Stamford, Conn.

[73] Assignee: The Continental Group, Inc., Stamford, Conn.

[21] Appl. No.: 386,378

[22] Filed: Jun. 8, 1982

[51] Int. Cl.³ .................. B65D 1/02; B65D 23/00; B65D 1/40
[52] U.S. Cl. ........................... 215/1 C; 220/70; 264/523; 264/532; 264/537; 428/35
[58] Field of Search ................. 215/1 C; 150/0.5; 220/69, 70; 428/35; 264/523, 532, 537

[56] References Cited

U.S. PATENT DOCUMENTS

| | | | |
|---|---|---|---|
| 2,723,779 | 11/1955 | Parker et al. .................. | 150/0.5 |
| 3,029,963 | 4/1962 | Evers ............................ | 215/1 C |
| 3,403,804 | 10/1968 | Colombo ...................... | 215/1 C X |
| 3,491,907 | 1/1970 | Eelkema ....................... | 215/1 C |
| 3,743,467 | 7/1973 | Lopez ........................... | 215/1 C X |
| 3,881,621 | 5/1975 | Adomaitis ..................... | 215/1 C |
| 4,108,324 | 8/1978 | Krishnakumar et al. ..... | 215/1 C |
| 4,151,249 | 4/1979 | Lee ............................... | 215/1 C X |

FOREIGN PATENT DOCUMENTS 1164261 2/1964 Fed. Rep. of Germany ....... 150/0.5

Primary Examiner—William Price
Assistant Examiner—Sue A. Weaver
Attorney, Agent, or Firm—Charles E. Brown

[57] ABSTRACT

This relates to an improvement on a recently developed ribbed preform in a champagne type bottle bottom formed therewith including solid internal ribs. In accordance with this invention, the ribs are made hollow or tubular in the preform with the resultant ribs in the bottle bottom also being hollow. The hollow ribs of the preform serve the same purpose as the prior solid ribs in retaining the plastic material of the preform in the bottom area during the bottle formation and the hollow ribs in the resultant bottle also provide the desired added stiffness for preventing bottom eversion.

19 Claims, 16 Drawing Figures 4,403,706

PLASTIC CONTAINER WITH HOLLOW INTERNAL RIB REINFORCED BOTTOM AND METHOD OF FORMING THE SAME

This invention relates in general to new and useful improvements in plastic bottles, and more particularly to bottles having bottoms of the so-called champagne type. Most particularly, this invention has to do with both the reinforcing of the bottom to prevent eversion of the central portion of the bottom and also a controlled distribution of the plastic material of the preform from which the bottle is formed during a forming operation.

There has been recently developed by myself and others a bottle of the type of which this invention relates, including one wherein the preform is provided with ribs and those ribs are utilized in the axial elongation of the preform to resist axial stretching and thinning of a base portion of the preform, and thereby assure that there is a greater than normal amount of material of the bottom with a resultant thinning of the body of the molded bottle. While such construction has proven to be commercially acceptable and highly feasible from a manufacturing standpoint, I have found that if the ribs, both initially in the preform formation and in the molded bottle are hollow, the same beneficial effects of material distribution and rib reinforcing are obtained with less material.

With the above and other objects in view that will hereinafter appear, the nature of the invention will be more clearly understood by reference to the following detailed description, the appended claims, and the several views illustrated in the accompanying drawings.

IN THE DRAWINGS

Figure 1:
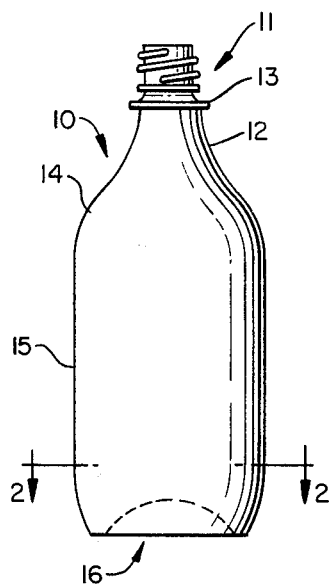
FIG. 1 is an elevational view of a plastic bottle which may have been formed either in accordance with the prior art or with this invention.

Referring now to the drawings in detail, it will be seen that there is illustrated in FIG. 1 a typical bottle formed of plastic material and including a champagne type bottom in accordance with this invention. The bottle generally identified by the numeral 10 and the proportions of the bottle are those of one generally of a one liter capacity. The proportions of the bottle 10 in no way have anything to do with this invention. The bottle 10, merely for identification purposes, includes a threaded neck finish 11, a neck 12 having an outwardly directed support flange 13, a flaring shoulder area 14, and a generally cylindrical body 15. The body 15 terminates at its lower end in a champagne type bottom generally identified by the numeral 16.

Figure 3:
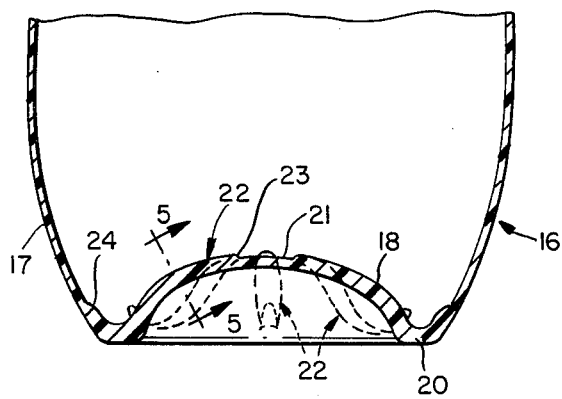
FIG. 3 is a fragmentary vertical sectional view taken generally along the line 3—3 of FIG. 2, and shows generally the cross section of the prior art ribs.

Referring now to FIG. 3, it will be seen that the bottom 16 includes an outer preferably part-spherical section 17 which is joined to the lower end of the body 15. The bottom 16 also includes an inner domed section 18 which is joined to the outer section 17 by a juncture section 20. The domed section 18, by the very nature of the formation of the bottle 10, includes an uppermost dome portion 21 which is normally of a thicker configuration than the remainder of the domed section 18.

The above described bottom 16 is a typical champagne type bottom and as described above is under high internal pressures within the bottle 10, such as exist when the liquid product is a carbonated beverage, applying high force on the domed section 18 urging the domed section 18 to evert so that the bottom will assume a generally hemispherical configuration. Further, since the bottles are intended to have a shelf life and there is a creep factor involved, there is a further tendency of the bottom structure to deform under the influence of time and pressure. Such gradual deformation of the bottom does not necessarily detract from a standpoint of either appearance or structural strength, but increases the volume of the bottle with the result that the fill line in the bottle drops and the bottle gives the general appearance of not having been completely filled.

It is therefore highly desirable that the bottom 16 be reinforced so that the configuration of the bottom remains substantially stable. It is also necessary that the amount of material used in obtaining such reinforcement be held to a minimum, otherwise the cost of reinforcement will exclude the bottle from a commercial competition standpoint.

Figure 2:
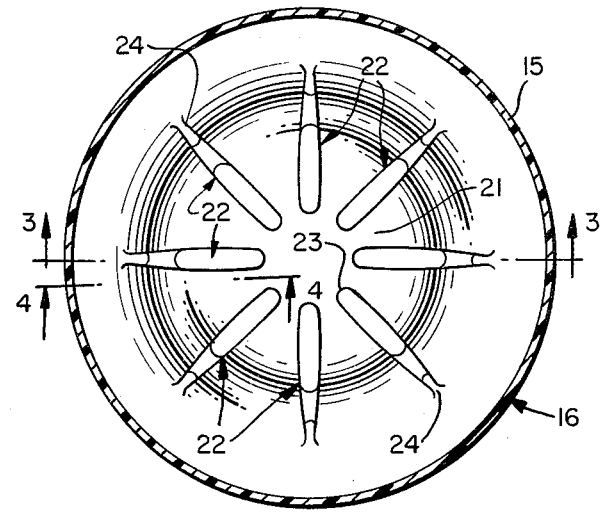
FIG. 2 is an enlarged horizontal sectional view taken generally along the line 2—2 of FIG. 1, and shows the bottom structure in plan.
Figure 4:
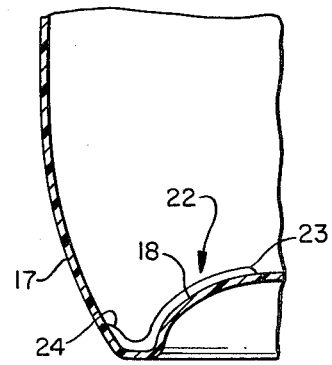
FIG. 4 is a fragmentary vertical sectional view taken generally along the line 4—4 of FIG. 2, and shows a typical rib, both prior art and in accordance with this invention, in elevation.
Figure 5:
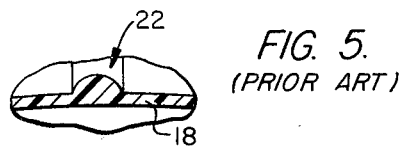
FIG. 5 is an enlarged sectional view transversely of one of the ribs taken along the line 5—5 of FIG. 3, and shows a typical prior art rib cross section.
Figure 6:
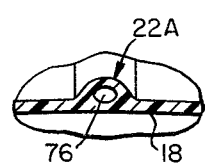
FIG. 6 is a sectional view similar to FIG. 5, and shows a typical rib cross section in accordance with this invention.

In accordance with both this invention and the prior, it is proposed to reinforce the bottom 16 by providing on the internal surface of the bottom a plurality of circumferentially spaced radiating ribs 22, as is best shown in FIG. 2. Preferably there will be eight ribs, as shown, although this number could obviously be varied depending upon rib size, bottle size, etc. Each of the ribs, as is best shown in FIGS. 2 and 4, extends from the lower part of the outer section 17 across the juncture section 20 and then across the domed section 18 to a point spaced from but adjacent to the domed portion 21. Each rib 22, as is best shown in FIGS. 5 and 6, is preferably of a rounded cross section, broadly speaking the cross section of one-half of an oval or ellipse.

It is to be noted also that the ribs 22 are of a generally streamlined configuration having a rounded radially inner nose portion 23 and rapidly increasing in width therefrom and thereafter gradually tapering toward a tail end 24. The configuration of the ribs 22 is as a result of the stretching of the plastic material in the blow molding formation of the bottom 16. However, the rib configuration illustrated in FIG. 2 has produced highly desirable results.

Figure 9:
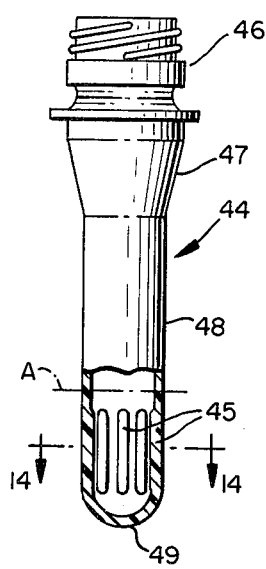
FIG. 9 is an elevational view of a preform for forming bottles in accordance with both this invention and the prior art, a hollow portion of the preform being broken away and shown in section.

This invention and the prior also relate to the provision of a simple preform for forming the bottle 10, the preform being identified by the numeral 44 and being specifically illustrated in FIG. 9. The preform 44 is of a conventional configuration for forming a champagne bottom except for the provision of internal ribs 45 which are circumferentially spaced and which extend longitudinally of the preform. Most specifically, the preform 44 includes an upper neck finish 46, a tapering upper portion 57, and a cylindrical lower portion 58 which terminates in a closed end 49 which normally will be of a hemispherical configuration.

FIG. 9 has been provided with an imaginary line A below which that part of the preform 44 serves to form the bottom 16 of the bottle 10. It is to be noted that the ribs 45 are primarily formed on the lower part of the lower tubular portion 48 and are disposed in their entirety below the line A.

Figure 8:
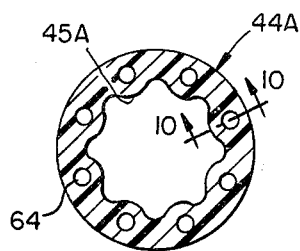
FIG. 8 is an transverse sectional view taken through a hollow portion of a preform having hollow ribs in accordance with this invention.
Figure 13:
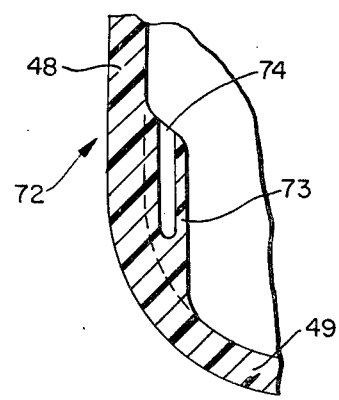

As is best shown in FIGS. 8 and 13, each of the ribs 45 is integrally formed with the tubular portion 48 and projects radially inwardly from the inner surface thereof. Further, each of the ribs 45 is in the form of an arcuate section.

Figure 15:
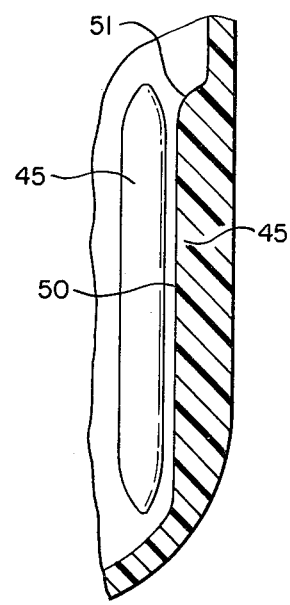
FIG. 15 is an enlarged fragmentary vertical sectional view similar to FIG. 10 taken along the line 15—15 of FIG. 14, and shows the specific prior art internal rib configuration.

Referring now to FIG. 15, it will be seen that each rib 45 has an innermost surface 50 which is parallel to the longitudinal axis of the preform 44. Each rib 45 terminates in the closed end 49 by blending therewith in a natural transition due to the curvature of the closed end 49. The upper end of each rib 45 terminates in a rounded end portion 51 which is rounded longitudinally, as shown in FIG. 15, and is rounded transversely in view of the natural curved section of the rib 45.

Figure 14:
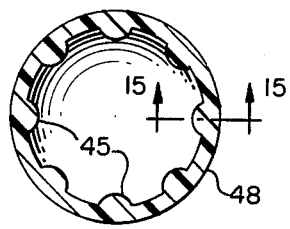
FIG. 14 is a transverse sectional view similar to FIG. 8 taken generally along the line 14—14 of FIG. 9, and shows the solid internal prior rib arrangement.

The prior art preform most specifically illustrated in FIGS. 14 and 15 has solid ribs 45. It has been found that these ribs provide sufficient stiffness to the lower portion of the preform such that during a bottle forming operation, as the preform is axially elongated, the ribs will resist axial stretching and thinning of the lower portion of the preform with the result that there is a greater axial stretching and thus thinning of the tubular portion 48 of the preform. Further, each rib 22 which is confined to the bottom of the bottle serves to reinforce the bottle bottom against the internal portion everting. Thus the prior art bottle with the solid ribs has been proven to be highly satisfactory. However, the cost of the plastic material utilized in the bottle is a major factor in the overall cost of such a bottle, and any savings of material is a highly desirable commercial factor if the saving of the material does not significantly reduce the strength of the bottle.

In accordance with the prior art it has been found that in the formation of a one liter bottle where the bottom segment normally weighs between 12 and 13 grams, the total weight of the added solid ribs 45 is on the order of $\frac{1}{2}$ gram, the weight of the ribbed bottom section increases, not from the customary 12-13 grams weight to the expected 12$\frac{1}{2}$-13$\frac{1}{2}$ gram weight, but to a 16-17 grams weight. In other words, the increase of weight of the bottom segment is on the order of 4 grams for an increase of only $\frac{1}{2}$ gram of plastic material. In accordance with this invention it has been found that by making the ribs 45 initially hollow, instead of the addition of $\frac{1}{2}$ gram to the weight of the bottom section, this can be reduced to an addition on the order of $\frac{3}{8}$ gram while obtaining the same results. More importantly, one may keep the same weight in the hollow ribs, as one would with the solid ribs and obtain a much stronger base, or have total base weight reduction potential.

While $\frac{1}{8}$ of a gram may at first glance be an insignificant amount of material, when this is multiplied by the millions of bottles formed, it will be seen that this is indeed a material cost factor which is actually a saving or profit factor.

Figure 10:
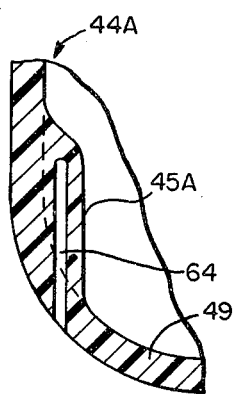
FIG. 10 is an enlarged fragmentary axial sectional view taken along the line 10—10 of FIG. 8 showing a preform formed in accordance with this invention.

Referring now specifically to FIGS. 8 and 10 of the drawings, it will be seen that the illustrated preform 44A has ribs 45A thereof formed so as to be hollow or tubular with there being a central bore 64.

Referring now to FIG. 10, it will be seen that the ribs 45A have the bore 64 formed therein from the bottom 49 of the preform. Thus, these bores may be readily formed by providing the end cap of the injection mold in which the preform 44A is formed with a plurality of pins, each of which is aligned with the core (not shown) to assure the centering of the bore 64 within the ribs 45A.

Figure 11:
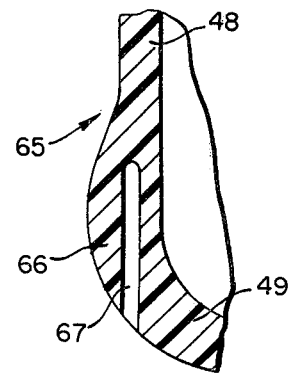
FIG. 11 is a fragmentary sectional view similar to FIG. 10 of a modified form of preform in accordance with this invention.

Referring now to FIG. 11, it will be seen that there is illustrated a lower portion only of another form of preform 65 wherein there are provided circumferentially spaced, axially extending ribs 66 which generally correspond with the ribs 45A, but which are formed on the exterior of the preform and thus require a split injection mold in the formation thereof. The ribs 66, like the ribs 45A, are also hollow or tubular and each has an axial bore 67 opening thereinto from the bottom.

Figure 12:
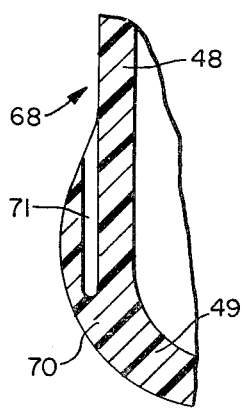
FIGS. 12 and 13 are further enlarged fragmentary elevational views of still another preform formed in accordance with this invention.

Referring now to FIG. 12 it will be seen that there is illustrated still another form of preform identified by the numeral 68 and also having circumferentially spaced, axially extending ribs 70 formed on the exterior thereof. The ribs 70 are also hollow or tubular and each has formed therein an axially extending bore 71 which opens from the ribs through the top thereof.

In FIG. 13 there is shown a still further form of preform identified by the numeral 72 and also having circumferentially spaced axially extending ribs 73. However, the ribs 73 are formed on the interior of the preform similar to the ribs 45A of FIG. 10. The ribs 73 are hollow or tubular and each has an axially extending bore 74. However, the bores 74 open into the interior of the preform and pins (not shown) which would form the bores 74 will be carried by the associated core. With this type of construction no splitting of the injection mold is required.

Figure 7:
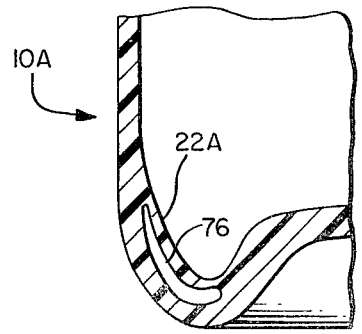
FIG. 7 is an enlarged fragmentary vertical sectional view similar to FIG. 3, and shows the rib formation in accordance with this invention.

In accordance with this invention the resultant bottle 10A of which only a lower corner portion is shown in FIG. 7, is provided with ribs 22A which correspond to the ribs 22 of the prior art bottle, but which are hollow having an internal open space 76 in accordance with the hollow preform rib from which the bottle 10A is formed. It is to be noted that the hollow space 76 is sealed at one end against the entrance of foreign matter into the container.

The rib 22A and the hollow space 76 formed therein are best shown in FIG. 6.

Figure 16:
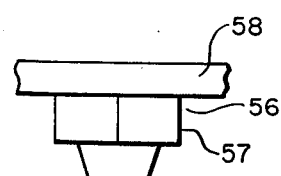
FIG. 16 is a schematic view showing the manner in which a champagne bottom bottle is formed in accordance with this invention using the preform of FIG. 9.
Figure 16:
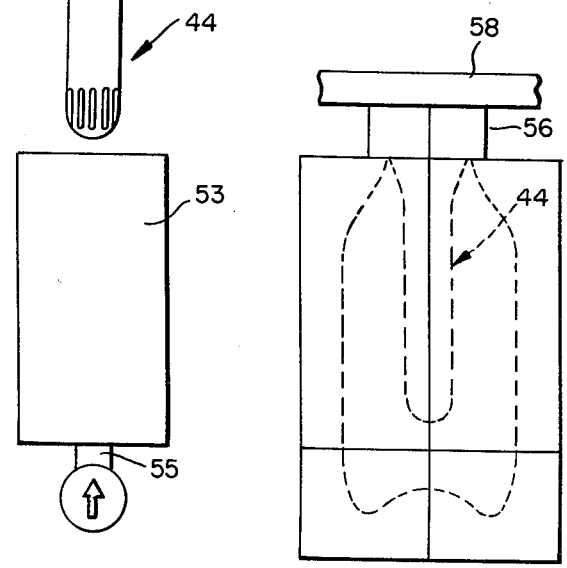
Figure 16:
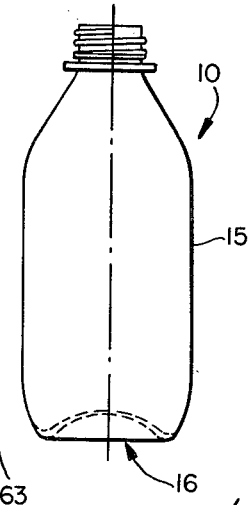

Reference is now made to FIG. 16 wherein it is illustrated how the prior art preform 44 or the hollow preform 44A, 65 and 68 of this invention may be formed and then blow molded to form either the bottle 10 or the bottle 10A.

A typical preform, the preform 44, is formed by injection molding within the cavity defining mold member 53 which has in communication therewith a nozzle arrangement 55 of a conventional plasticizer.

The upper end of the cavity defined by the mold member 53 has a continuation defined by a split neck mold assembly 56 which includes a pair of neck mold members 57 carried by a mounting plate 58 which also functions as a support for a core member (not shown).

After the preform has been formed, it is then either transferred to a blow mold 63 while still on the core member or by a separate support means (not shown). The blow mold 63 is preferably a split mold and is a conventional mold for forming a champagne bottom bottle which would be identical to the bottles 10 and 10A but without the internal reinforcing or stiffening ribs. The preform is blow molded within the blow mold 63 in the customary manner to form a bottle 10 and is normally axially elongated by the use of a conventional stretch rod (not shown) prior to the introduction of the blowing gas.

It is to be understood that the utilization of a stretch rod greatly facilitates the thinning of the tubular portion of the preform while the ribs 22, 22A serve to stiffen and prevent an axial elongation and resultant thinning of the bottom forming portion of the preform. In this manner the body 15 of the resultant bottle is provided with a thinner wall while the weight of the plastic material in the bottom is increased much above that of the added weight of the ribs. The thinning of the body of the bottle is in no way detrimental to the strength of the bottle in that the stresses induced into the bottle are readily withstood by the quite thin bottle body and the introduction of more weight into the bottle bottom is highly desirable since this is the weakest area of the bottle under internal pressures.

Although only several preferred embodiments of the improvements of this invention have been specifically illustrated and described, minor variations may be made in both the preform and the resultant bottle without departing from the spirit and scope of the invention as defined in the appended claims.

I claim:

1. A preform for use in the blow molding formation of a container formed of plastic material and having a generally champagne base, said preform including a tubular body terminating in a rounded bottom, said preform being improved by the addition of circumferentially spaced stiffening ribs extending axially along said body starting at points spaced from but adjacent to said rounded bottom and terminating in said rounded bottom, each of said ribs being tubular and thus hollow.

2. A preform according to claim 1 wherein the hollow in each of said ribs is defined by an axially extending bore.

3. A preform according to claim 1 wherein the hollow in each of said ribs is defined by an axially extending bore opening into the interior of said preform.

4. A preform according to claim 1 wherein the hollow in each of said ribs is defined by an axially extending bore opening exteriorly of said preform.

5. A preform according to claim 1 wherein the hollow in each of said ribs is defined by an axially extending bore extending parallel to the general axis of said preform.

6. A preform according to claim 1 wherein said ribs are disposed in the interior of said preform.

7. A preform according to claim 1 wherein said ribs are disposed on the exterior of said preform.

8. A blow molded plastic material beverage bottle having a reversely turned bottom of the champagne type, said bottle including a body terminating at its lower end in a radially inwardly curved upper bottom portion which terminates in turn in a reversely turned annular base portion, and said bottom inwardly of said base portion being inverted and of a generally frustoconical configuration, said bottom being reinforced by radiating ribs disposed internally of said bottle and extending across said base portion, said ribs being tubular.

9. A bottle according to claim 8 wherein said ribs are confined to said bottom.

10. A bottle according to claim 9 wherein said ribs have inner ends spaced both circumferentially and radially from each other.

11. A bottle according to claim 8 wherein said ribs have inner ends spaced both circumferentially and radially from each other.

12. A bottle according to claim 9 wherein the plastic material of said bottle is biaxially oriented and evidencing axial elongation, and wherein said ribs also defining means for restricting axial elongation of the bottom forming portion of the plastic material of said bottle during blow molding wherein there is visual evidence of thinning of said body and a retention of material in said bottom.

13. A bottle according to claim 8 wherein said ribs are closed at ends of said ribs.

14. A method of forming a blow molded plastic material beverage bottle having a reversely turned bottom of the champagne type, said bottle including a body terminating at its lower end in a radially inwardly curved upper bottom portion which terminates a turn in a reversely turned annular base portion, and said bottom inwardly of said base portion being inverted and of a generally frustoconical configuration, said bottom being reinforced by radiating ribs disposed internally of said bottle and extending across said base portion, said ribs being tubular, said method comprising the steps of providing a plastic material preform of the type including a tubular body terminating in a rounded bottom, said preform being improved by the addition of circumferentially spaced stiffening ribs extending axially along said body starting at points spaced from but adjacent to said rounded bottom and terminating in said rounded bottom, each of said ribs being tubular, placing said preform in a blow mold cavity of a shape defining said bottle, and axially elongating and radially expanding said preform to the contour of said bottle.

15. A method according to claim 14 wherein each rib initially has one open end, and said open end is sealed closed during the forming of said bottle.

16. A preform according to claim 3 wherein said ribs are disposed in the interior of said preform.

17. A preform according to claim 4 wherein said ribs are disposed in the interior of said preform.

18. A preform according to claim 3 wherein said ribs are disposed on the exterior of said preform.

19. A preform according to claim 4 wherein said ribs are disposed on the exterior of said preform.

* * * * *